(12) United States Patent
Volny et al.

(10) Patent No.: US 10,464,682 B2
(45) Date of Patent: Nov. 5, 2019

(54) NEGATIVE LIFT EVACUATION SLIDE

(71) Applicant: GOODRICH CORPORATION, Charlotte, NC (US)

(72) Inventors: Jaro S. Volny, Scottsdale, AZ (US); Craig Erwin Prevost, Cave Creek, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 399 days.

(21) Appl. No.: 15/400,757

(22) Filed: Jan. 6, 2017

(65) Prior Publication Data
US 2018/0194482 A1    Jul. 12, 2018

(51) Int. Cl.
*B64D 25/14*    (2006.01)

(52) U.S. Cl.
CPC ................... *B64D 25/14* (2013.01)

(58) Field of Classification Search
CPC ...... B64D 25/14; B63B 2027/145; A62B 1/20
See application file for complete search history.

(56) References Cited

U.S. PATENT DOCUMENTS

| | | | | |
|---|---|---|---|---|
| 3,370,684 A * | 2/1968 | Holcombe | ............... | A62B 1/20 193/25 B |
| 3,860,984 A * | 1/1975 | Fisher | ..................... | A62B 1/20 182/48 |
| 4,332,049 A * | 6/1982 | Fisher | ..................... | A62B 1/20 169/48 |
| 4,434,870 A * | 3/1984 | Fisher | ..................... | A62B 1/20 182/48 |
| 4,989,690 A * | 2/1991 | Mancosu | ................. | A62B 1/20 182/48 |
| 6,298,970 B1 * | 10/2001 | Targiroff | ............... | B64D 25/14 182/48 |
| 6,471,001 B1 * | 10/2002 | Baker | .................... | B64D 25/14 182/48 |
| 2003/0234323 A1 * | 12/2003 | Danielson | ................ | A62B 1/20 244/137.2 |
| 2004/0118979 A1 * | 6/2004 | Moro | .................... | B64D 25/14 244/137.2 |
| 2014/0196986 A1 * | 7/2014 | Grainger | ................ | B63B 27/30 182/48 |

FOREIGN PATENT DOCUMENTS

| | | |
|---|---|---|
| EP | 0383033 | 8/1990 |
| EP | 1431178 | 6/2004 |

OTHER PUBLICATIONS

EP Search Report dated Mar. 2, 2018 in EP Application No. 18150454.9.

* cited by examiner

*Primary Examiner* — Philip J Bonzell
*Assistant Examiner* — Tye William Abell
(74) *Attorney, Agent, or Firm* — Snell & Wilmer L.L.P.

(57) ABSTRACT

The evacuation assembly may include an evacuation slide having a head portion, a toe portion, a longitudinal axis, a top surface, and a bottom surface. In various embodiments, the longitudinal axis extends centrally along a length of the evacuation slide from the head portion to the toe portion. In various embodiments, a top perimetrical length of the top surface of the toe portion of the evacuation slide in a width direction that is perpendicular to the longitudinal axis is less than a bottom perimetrical length of the bottom surface of the toe portion of the evacuation slide in the width direction.

18 Claims, 8 Drawing Sheets

NEGATIVE LIFT EVACUATION SLIDE

FIELD

The present disclosure relates to aircraft evacuation assemblies, and more specifically to evacuation slides.

BACKGROUND

An evacuation slide assembly may include an inflatable slide that helps passengers disembark from an aircraft in the event of an emergency or other evacuation event. The slides may deploy from a door sill or a side of the aircraft fuselage. A common problem associated with inflatable evacuation slides, however, is that when such slides are deployed in high lateral wind conditions, the wind may cause the slide to "kite" such that the toe end of the slide does not touch the ground, rendering the slide less usable. If the slide lifts off the ground above the airplane's door sill height after full extension, the slide may even block the aircraft exit and prevent safe evacuation of passengers and crew.

SUMMARY

Disclosed herein, according to various embodiments, is an evacuation assembly of an aircraft. The evacuation assembly may include an evacuation slide having a head portion, a toe portion, a longitudinal axis, a top surface, and a bottom surface. In various embodiments, the longitudinal axis extends centrally along a length of the evacuation slide from the head portion to the toe portion. In various embodiments, a top perimetrical length of the top surface of the toe portion of the evacuation slide in a width direction that is perpendicular to the longitudinal axis is less than a bottom perimetrical length of the bottom surface of the toe portion of the evacuation slide in the width direction.

In various embodiments, the evacuation slide is an inflatable evacuation slide. The inflatable evacuation slide may include a longitudinally extending support tube having a hemi-circular cross-sectional shape. A chord surface of the longitudinally extending support tube may form at least a portion of the top surface of the inflatable evacuation slide and an arc surface of the longitudinally extending support tube may form at least a portion of the bottom surface of the inflatable evacuation slide. In various embodiments, the inflatable evacuation slide has a longitudinally extending support tube having an airfoil cross-sectional shape. The airfoil cross-sectional shape may have a leading edge, a trailing edge, a pressure surface extending between the leading edge and the trailing edge, and a suction surface extending between the leading edge and the trailing edge. The pressure surface may form at least a portion of the top surface of the inflatable evacuation slide and the suction surface may form at least a portion of the bottom surface of the inflatable evacuation slide.

In various embodiments, the longitudinally extending support tube includes ties that impart the airfoil cross-sectional shape. For example, the ties may be disposed internally within the longitudinally extending support tube and may extend between the pressure surface and the suction surface. In various embodiments, the longitudinally extending support tube includes a plurality of cells that impart the airfoil cross-sectional shape. In various embodiments, the plurality of cells extend in the width direction. In various embodiments, the plurality of cells extend parallel to the longitudinal axis of the evacuation slide.

In various embodiments, the inflatable evacuation slide includes a sliding surface that forms at least a portion of the top surface of the inflatable evacuation slide. The inflatable evacuation slide may include a longitudinally extending support tube that is configured to support the sliding surface. The inflatable evacuation slide may include two longitudinally extending border support tubes that extend parallel to the longitudinal axis, wherein the sliding surface is laterally bordered by and disposed between the two longitudinally extending border support tubes.

In various embodiments, the longitudinally extending support tube is coupled to a lower side of the sliding surface. The longitudinally extending support tube may have a larger diameter than the two longitudinally extending border support tubes. In various embodiments, the evacuation assembly further includes a sheet coupled to and extending between lower portions of the longitudinally extending support tube and the two longitudinally extending border support tubes, wherein the sheet forms at least a portion of the bottom surface of the inflatable evacuation slide.

In various embodiments, the longitudinally extending support tube forms a middle divider between the two longitudinally extending border support tubes and divides the sliding surface into two lanes. The evacuation assembly may further include a sheet coupled to and extending between lower portions of the longitudinally extending support tube and the two longitudinally extending border support tubes, wherein the sheet forms at least a portion of the bottom surface of the inflatable evacuation slide. The inflatable evacuation slide further may include a transverse support tube that extends in the width direction and that forms at least a portion of the bottom surface of the inflatable evacuation slide.

Also disclosed herein, according to various embodiments, is an evacuation assembly of an aircraft that includes an inflatable evacuation slide. The inflatable evacuation slide may include a longitudinally extending support tube, two longitudinally extending border support tubes, a head portion, a toe portion, a longitudinal axis, a top surface, and a bottom surface. The longitudinal axis may extend centrally along a length of the evacuation slide from the head portion to the toe portion. A top perimetrical length of the top surface of the toe portion of the inflatable evacuation slide in a width direction that is perpendicular to the longitudinal axis may be less than a bottom perimetrical length of the bottom surface of the toe portion of the inflatable evacuation slide in the width direction. The evacuation assembly may further include a sliding surface coupled to the longitudinally extending support tube and the two longitudinally extending border support tubes, wherein the two longitudinally extending border support tubes extend parallel to the longitudinal axis and wherein the sliding surface forms at least a portion of the top surface of at least the toe portion of the inflatable evacuation slide. The evacuation assembly may further include a sheet coupled to the longitudinally extending support tube and the two longitudinally extending border support tubes. The sheet may from at least a portion of the bottom surface of at least the toe portion of the inflatable evacuation slide.

Further disclosed herein, according to various embodiments, is a method of manufacturing an evacuation slide of an evacuation assembly of an aircraft. The method may include coupling a sliding surface between two longitudinally extending border support tubes to form at least a portion of a top surface of the evacuation slide. The method may further include coupling a longitudinally extending support tube to the sliding surface between the two longitudinally extending border support tubes, wherein the longitudinally extending support tube has a larger cross-sectional diameter than the two longitudinally extending border support tubes. The method may also include coupling a sheet to the two longitudinally extending border support tubes and to the longitudinally extending support tube to form at least a portion of a bottom surface of the evacuation slide. A top perimetrical length of the top surface of at least a toe portion of the evacuation slide in a width direction perpendicular to a longitudinal axis of the evacuation slide may be less than a bottom perimetrical length of the bottom surface of the toe portion of the evacuation slide in the width direction.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation. Throughout the present disclosure, like reference numbers denote like elements. Accordingly, elements with like element numbering may be shown in the figures but may not be necessarily be repeated herein for the sake of clarity.

A first component that is "axially outward" of a second component means that a first component is positioned at a greater distance in either longitudinal direction away from the longitudinal center of the composite component along its longitudinal axis than the second component. A first component that is "axially inward" of a second component means that the first component is positioned closer to the longitudinal center of the composite component along its longitudinal axis than the second component.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1:
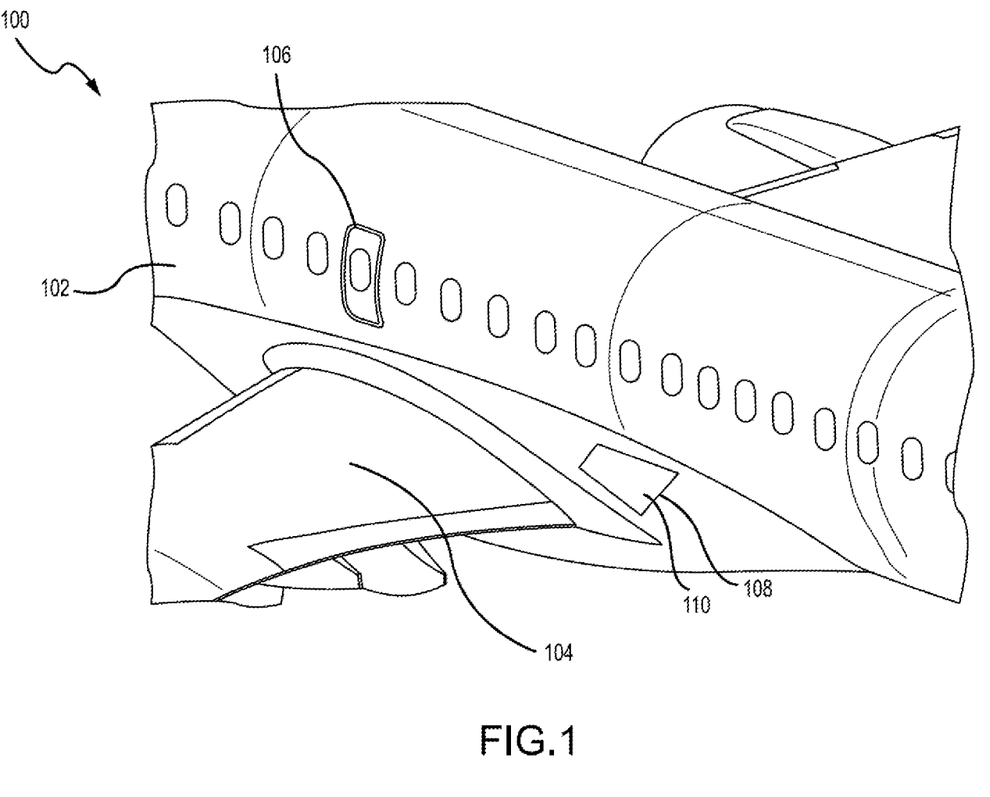
FIG. 1 illustrates a perspective view of an evacuation assembly of an aircraft, in accordance with various embodiments.

Referring to FIG. 1, an exemplary aircraft 100 is shown, in accordance with various embodiments. Aircraft 100 may comprise a fuselage 102 with wings 104 fixed to fuselage 102. Emergency exit door 106 may be disposed on fuselage over wing 104 such that passengers exiting emergency exit door 106 would exit onto wing 104. An evacuation slide assembly 108 may be disposed aft of emergency exit door 106. Blowout panel 110 may cover evacuation slide assembly 108 when installed on the aircraft 100. In various embodiments, the evacuation slide assembly 108 may include and/or be housed within a packboard mounted to the aircraft 100.

The evacuation slide assembly 108 may jettison the blowout panel 110 and deploy an evacuation slide, such as an inflatable evacuation slide, in response to emergency exit door 106 opening or in response to another evacuation event. As noted above, conventional evacuation slides are often subject to "kiting" under high wind conditions, rendering such slides less usable.

Accordingly, the present disclosure provides an evacuation slide of an aircraft evacuation assembly that has a top surface that has a top perimetrical length that is less than a bottom perimetrical length of a bottom surface of the evacuation slide. In other words, and according to various embodiments, the top flow path (i.e., the top perimetrical length) of wind across the top surface of the evacuation slide in a width direction, which is generally perpendicular to the longitudinal axis of the evacuation slide, is shorter than the bottom flow path (i.e., the bottom perimetrical length) of wind across the bottom surface. Said differently, the term "perimetrical length" refers to the length of the air flow path across either a top or a bottom surface of the evacuation slide. Accordingly, the velocity of the wind flowing across the top surface (e.g., along the top perimetrical length) is less than the velocity of the wind flowing across the bottom surface (e.g., along the bottom perimetrical length), and such a velocity difference creates a pressure differential, per Bernoulli's principle, that produces a downward force on the evacuation slide. Thus, the inverted airfoil-like shape/geometry of the evacuation slide in a deployed state generally creates negative lift in windy conditions, thereby mitigating the "kiting" effect described above. As used herein, the term "airfoil-like" generally refers to a shape that has a leading edge, a trailing edge, a pressure surface extending between the leading edge and the trailing edge, and a suction surface extending between the leading edge and the trailing edge, wherein the arc length of the pressure surface (e.g., the top perimetrical length) is less than the arc length of the suction surface (e.g., the bottom perimetrical length).

Figure 4A:
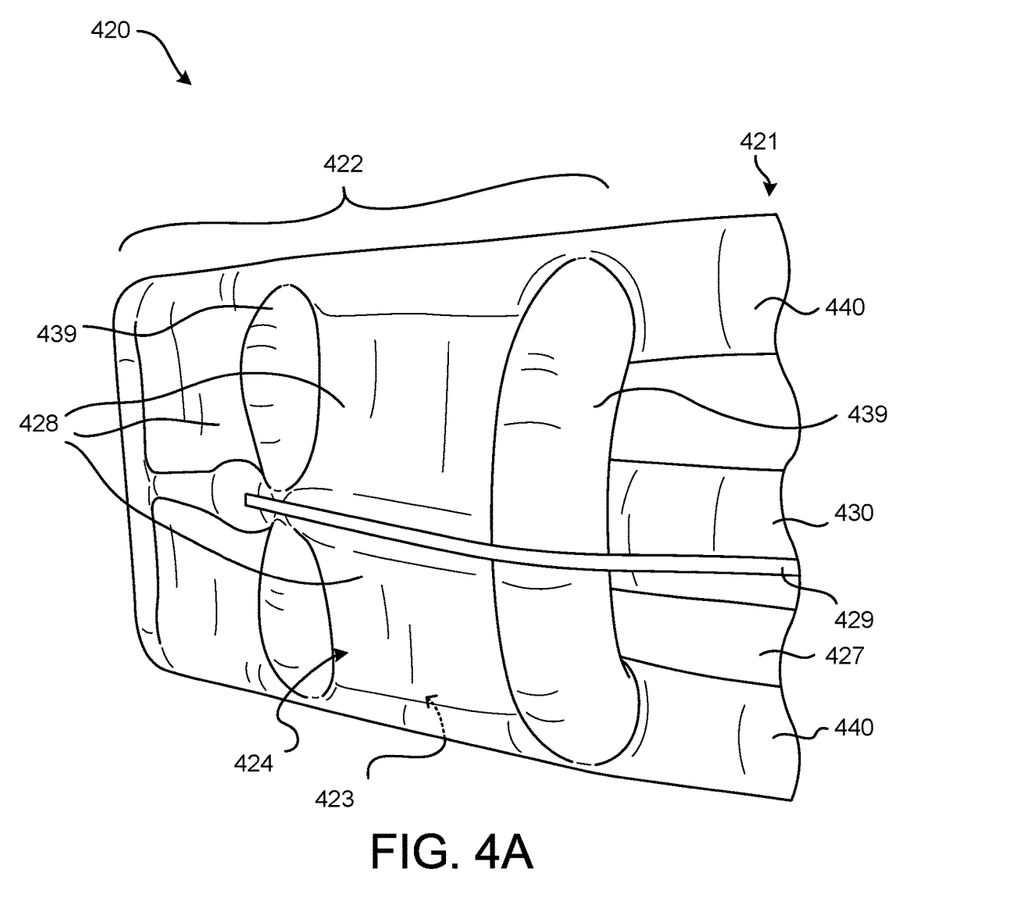
FIG. 4A illustrates a bottom perspective view of an evacuation slide, in accordance with various embodiments.
Figure 4B:
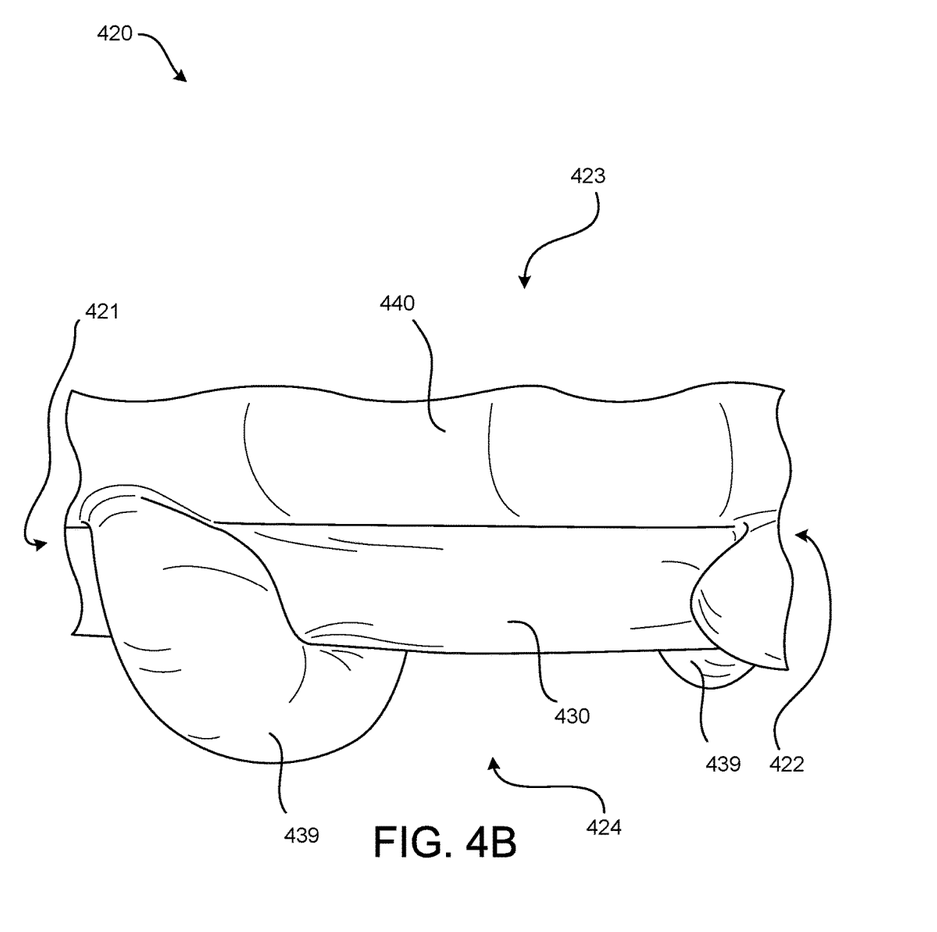
FIG. 4B illustrates a side perspective view of the evacuation slide of FIG. 4A, in accordance with various embodiments.

In various embodiments, and with momentary reference to FIGS. 4A and 4B, the evacuation slide 420 has a head portion 421 that is configured to be coupled or mounted to the aircraft 100 and a toe portion 422 that is configured to engage the ground in a deployed state. In various embodiments, the evacuation slide 420 has the inverted airfoil-like configuration at least at the toe portion 422 of the slide 420, but the evacuation slide 420 may have the inverted airfoil-like configuration along the entire longitudinal length of the evacuation slide 420 (e.g., from the head portion 421 to the toe portion 422).

In various embodiments, and with reference to FIGS. 2A, 2B, 2C, and 2D, the evacuation slide may be an inflatable evacuation slide 220A, 220B, 220C, 220D and may include a longitudinally extending support tube 230A, 230B, 230C, 230D that extends along the length of the inflatable evacuation slide 220A, 220B, 220C, 220D to provide support to the inflatable evacuation slide 220A, 220B, 220C, 220D. The longitudinally extending support tube 230A, 230C may have a hemi-circular cross-sectional shape that contributes to the inverted airfoil-like configuration described generally above. The term "hemi-circular" as used herein generally refers to a circular shape that has a chord surface and an arcuate surface. Accordingly, the cross-sectional shape may resemble various circular shapes, such as a segmented/partial ellipse or a segmented/partial obround shape. In various embodiments, a chord surface 233A, 233C of the longitudinally extending support tube 230A, 230C may at least partially form the top surface of the inflatable evacuation slide 220A, 220C and an arc surface 234A, 234C of the longitudinally extending support tube 230A, 230C may at least partially form the bottom surface of the inflatable evacuation slide 220A, 220C.

Figure 2A:
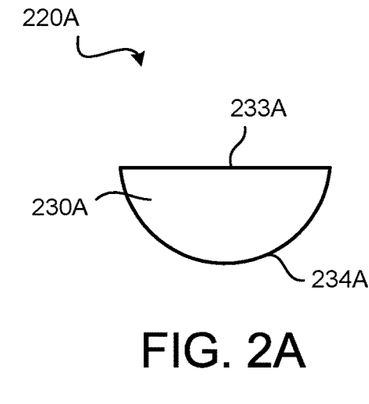
FIGS. 2A, 2B, 2C, and 2D illustrate schematic cross-sectional views of an evacuation slide, in accordance with various embodiments.
Figure 2B:
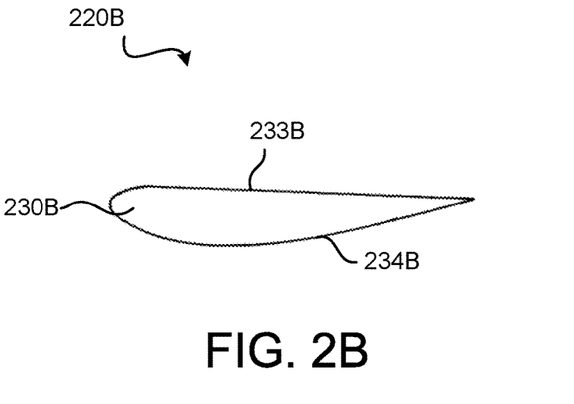
Figure 2C:
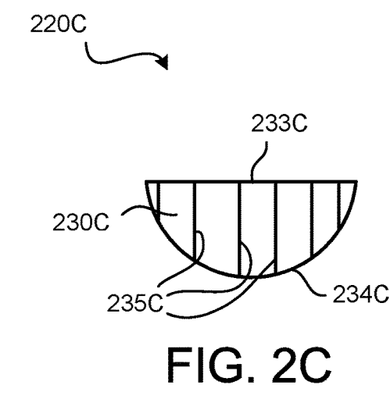
Figure 2D:
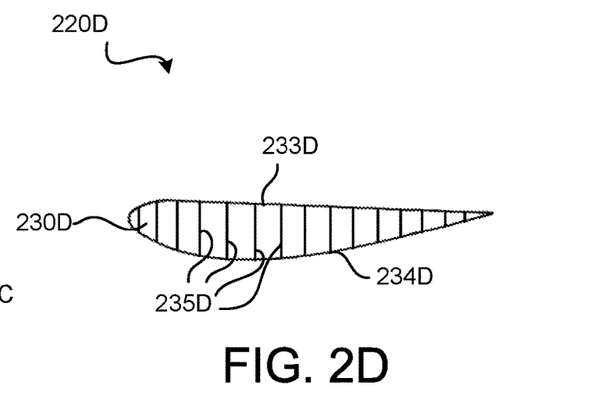

In various embodiments, the longitudinally extending support tube 230B, 230D may have an air-foil cross-sectional shape such that a pressure surface 233B, 233D of the longitudinally extending support tube 230B, 230D may at least partially form the top surface of the inflatable evacuation slide 220B, 220D and a suction surface 234B, 234D of the longitudinally extending support tube 230B, 230D may at least partially form the bottom surface of the inflatable evacuation slide 220B, 220D. With reference to FIGS. 2C and 2D, the longitudinally extending support tube 230C, 230D may include one or more ties 235C, 235D that hold the tube in the desired cross-sectional shape. For example, in various embodiments the one or more ties 235C, 235D may be disposed internally within the longitudinally extending support tube 230C, 230D and may extend between opposing surfaces, such as between the pressure surface 233D and the suction surface 234D.

Figure 5:
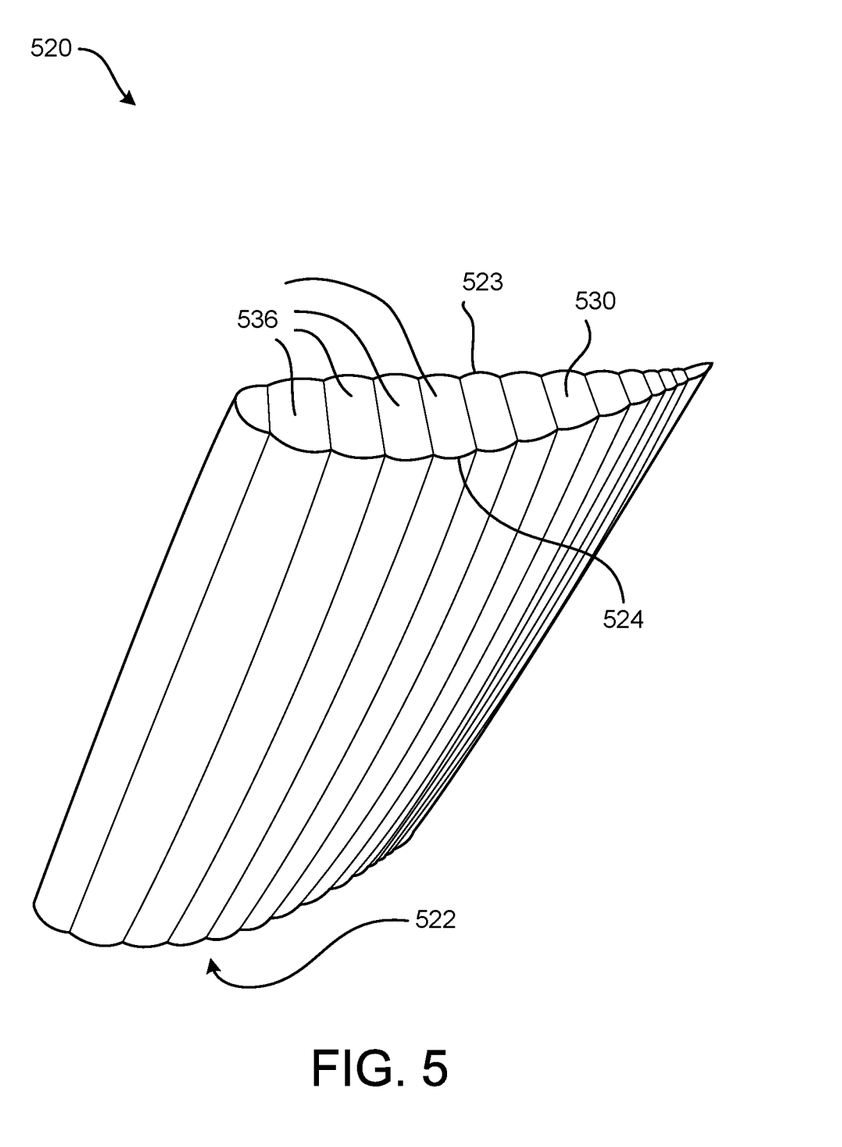
FIGS. 5 and 6 illustrate schematic perspective views of an evacuation slide having a plurality of cells, in accordance with various embodiments.
Figure 6:
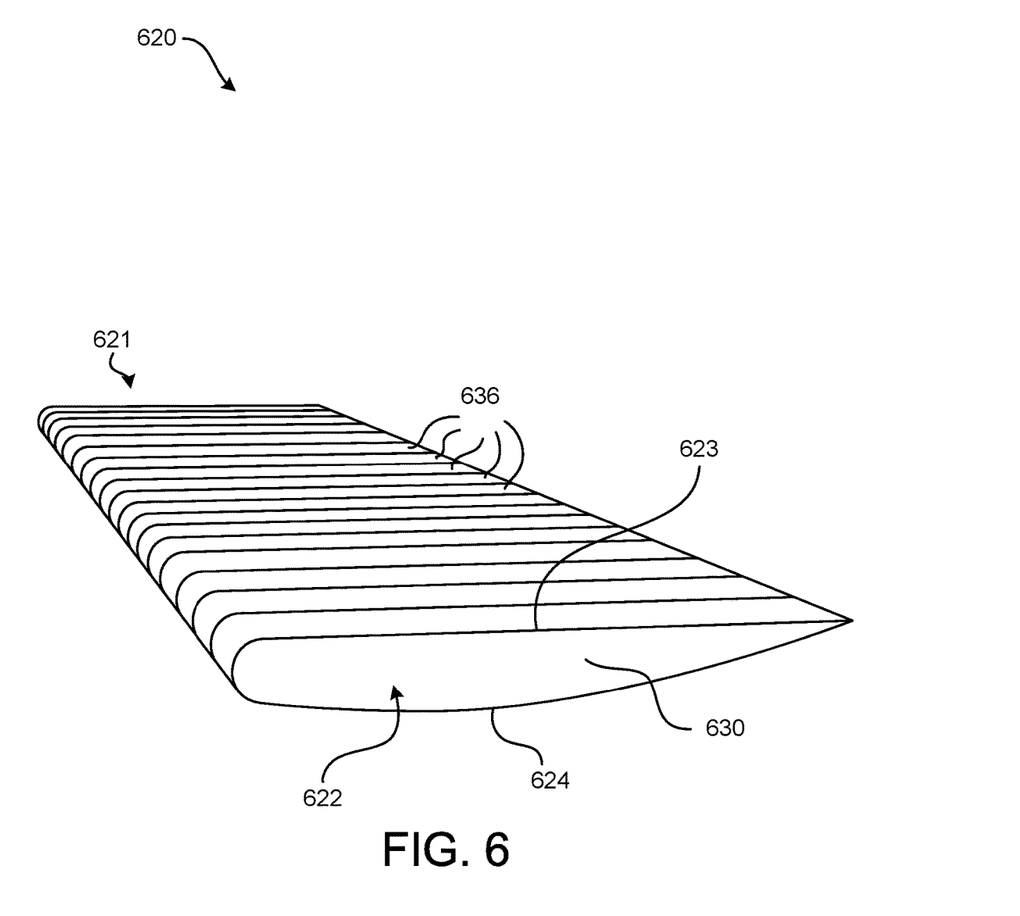

In various embodiments, and with reference to FIGS. 5 and 6, the longitudinally extending support tube 530, 630, which is a component of the inflatable evacuation slide 520, 620 and which at least partially imparts the inverted airfoil-like configuration to the inflatable evacuation slide 520, 620, includes a plurality of cells 536, 636 that maintain the longitudinally extending support tube 530, 630 in the desired shape. In various embodiments, and with reference to FIG. 5, the plurality of cells 536 may extend parallel to the longitudinal axis of the inflatable evacuation slide 520 (e.g., the plurality of cells 536 may extend from the head portion to the toe portion 522 of the inflatable evacuation slide 520). In various embodiments, and with reference to FIG. 6, the plurality of cells 636 may extend in the width direction (e.g., perpendicular to the longitudinal axis of the inflatable evacuation slide 620).

Figure 3A:
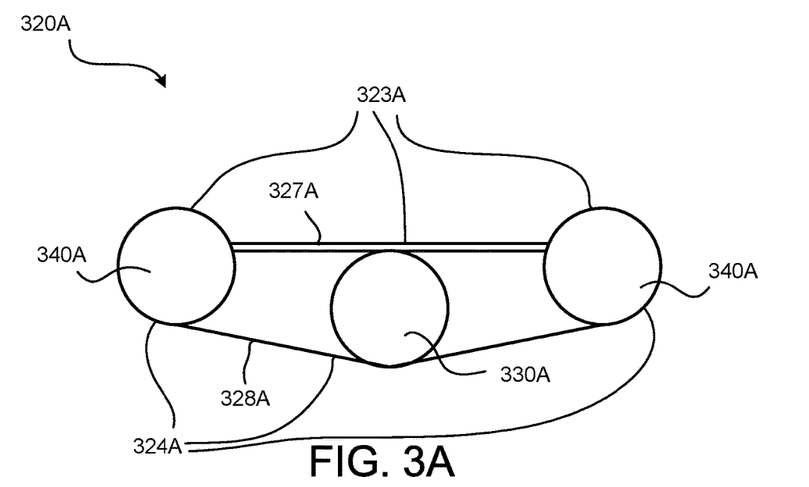
FIGS. 3A and 3B illustrate schematic cross-sectional views of an evacuation slide, in accordance with various embodiments.
Figure 3B:
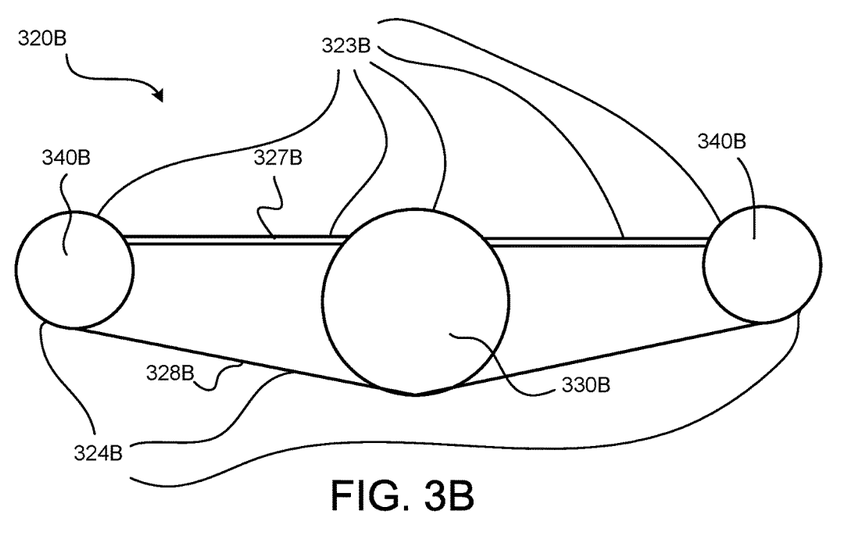

In various embodiments, and with reference to FIGS. 3A and 3B, the inflatable evacuation slide 320A, 320B includes two longitudinally extending border support tubes 340A, 340B. The inflatable evacuation slide 320A, 320B may include a sliding surface 327A, 327B (e.g., a surface upon passengers may slide) that is laterally bordered by and disposed between the two longitudinally extending border support tubes 340A, 340B. The sliding surface 327A, 327B may form at least a portion of the top surface 323A, 323B of the inflatable evacuation slide 320A, 320B.

The longitudinally extending support tube 330A, 330B may also be coupled to the sliding surface 327A, 327B. In various embodiments, and with reference to FIG. 3A, the longitudinally extending support tube 330A may be coupled to a lower side of the sliding surface 327A, which may impart the airfoil-like shape/geometry to the inflatable evacuation slide 320A. In various embodiments, and with reference to FIG. 3B, the longitudinally extending support tube 330B may form a middle divider disposed between the two longitudinally extending border support tubes 340B and thus may divide the sliding surface 327B into two passenger sliding lanes. In various embodiments, the longitudinally extending support tube 330B has a larger diameter than the two longitudinally extending border support tubes 340B, which may impart the airfoil-like shape/geometry to the inflatable evacuation slide 320B.

In various embodiments, the inflatable evacuation slide 320A, 320B may further include a sheet 328A, 328B, made from a fabric, plastic, or other similar material, that is coupled to and extends between lower portions of the longitudinally extending support tube 330A, 330B and the two longitudinally extending border support tubes 340A, 340B. The sheet 328A, 328B may form at least a portion of the bottom surface 324A, 324B of the inflatable evacuation slide 320A, 320B. The sheet 328A, 328B may improve the continuity of the bottom surface 324A, 324B of the inflatable evacuation slide 320A, 320B and thus may improve the negative lift created by the inflatable evacuation slide 320A, 320B.

In various embodiments, and with reference to FIGS. 4A and 4B, the inflatable evacuation slide 420 includes one or more transverse support tubes 439 that extend in the width direction and that form at least a portion of the bottom surface 424 of the inflatable evacuation slide 420. FIG. 4B shows the sheet removed in order to show the relative size between the longitudinally extending support tube 430 and the two longitudinally extending border support tubes 440. The sheet 428 may be coupled to and/or may extend over/across the transverse support tubes 439. In various embodiments, the inflatable evacuation slide 420 may include various other features, such as auxiliary strap 429 which may extend along the longitudinally extending support tube 430 to provide further stabilization to the inflatable evacuation slide 420. The sliding surface 427 of the inflatable evacuation slide 420 may form at least a portion of the top surface 423 of the inflatable evacuation slide 420.

Figure 7:
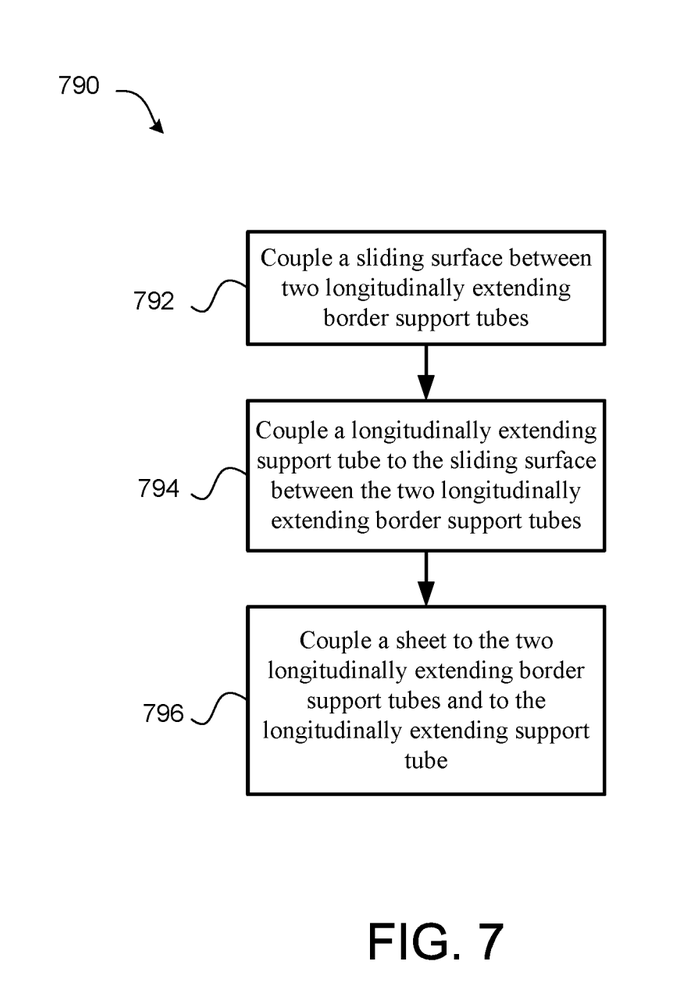
FIG. 7 is a schematic flow chart diagram of a method of manufacturing an evacuation slide of an evacuation assembly, in accordance with various embodiments.

In various embodiments, and with reference to FIG. 7, a method 790 of manufacturing an evacuation slide of an aircraft evacuation assembly is provided. The method 790 may include coupling a sliding surface between two longitudinally extending border support tubes at step 792 and coupling a longitudinally extending support tube to the sliding surface between the two longitudinally extending border support tubes at step 794. Step 792 may form at least a portion of a top surface of the evacuation slide. Also, the longitudinally extending support tube disposed between the two longitudinally extending border support tubes may have a larger cross-sectional diameter than the two longitudinally extending border support tubes. The method 790 may further include coupling a sheet to the two longitudinally extending border support tubes and to the longitudinally extending support tube at step 796. Step 796 form at least a portion of a bottom surface of the evacuation slide. In various embodiments, a top perimetrical length of the top surface of at least a toe portion of the evacuation slide in a width direction perpendicular to a longitudinal axis of the evacuation slide is less than a bottom perimetrical length of the bottom surface of the toe portion of the evacuation slide in the width direction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation assembly of an aircraft, the evacuation assembly comprising:
   an evacuation slide being shaped and configured to produce negative lift in response to air flowing across the evacuation slide in a width direction, wherein the width direction is perpendicular to a longitudinal axis of the evacuation slide;
   wherein:
   the evacuation slide comprises a head portion, a toe portion, a top surface, and a bottom surface;
   the longitudinal axis extends centrally along a length of the evacuation slide from the head portion to the toe portion;
   a top perimetrical length of the top surface of the toe portion of the evacuation slide in the width direction is less than a bottom perimetrical length of the bottom surface of the toe portion of the evacuation slide in the width direction;
   the top perimetrical length is defines as a top length of a top air flow path across the top surface of the toe portion of the evacuation slide in the width direction;
   the bottom perimetrical length is defined as a bottom length of a bottom air flow path across the bottom surface of the toe portion of the evacuation slide in the width direction; and
   a longitudinally extending support tube having an airfoil cross-sectional shape.

2. The evacuation assembly of claim 1, further comprising a sheet coupled to and extending between lower portions of longitudinally extending support tubes, wherein the sheet forms at least a portion of the bottom surface of the evacuation slide and contributes to the bottom perimetrical length.

3. The evacuation assembly of claim 1, wherein the longitudinally extending support tube comprises ties that impart the airfoil cross-sectional shape.

4. The evacuation assembly of claim 3, wherein the ties are disposed internally within the longitudinally extending support tube and extend between a pressure surface and a suction surface of the airfoil cross-sectional shape.

5. The evacuation assembly of claim 1, wherein the evacuation slide comprises the longitudinally extending support tube having an airfoil cross-sectional shape, wherein the airfoil cross-sectional shape has a leading edge, a trailing edge, a pressure surface extending between the leading edge and the trailing edge, and a suction surface extending between the leading edge and the trailing edge, wherein the pressure surface forms at least a portion of the top surface of the evacuation slide and the suction surface forms at least a portion of the bottom surface of the evacuation slide.

6. The evacuation assembly of claim 5, wherein the longitudinally extending support tube comprises a plurality of cells that impart the airfoil cross-sectional shape.

7. The evacuation assembly of claim 6, wherein the plurality of cells extend in the width direction.

8. The evacuation assembly of claim 6, wherein the plurality of cells extend parallel to the longitudinal axis of the evacuation slide.

9. The evacuation assembly of claim 1, wherein the evacuation slide comprises a sliding surface that forms at least a portion of the top surface of the inflatable evacuation slide.

10. The evacuation assembly of claim 9, wherein the inflatable evacuation slide comprises a longitudinally extending support tube that is configured to support the sliding surface.

11. The evacuation assembly of claim 10, wherein the inflatable evacuation slide comprises two longitudinally extending border support tubes that extend parallel to the longitudinal axis, wherein the sliding surface is laterally bordered by and disposed between the two longitudinally extending border support tubes.

12. The evacuation assembly of claim 11, wherein the longitudinally extending support tube is coupled to a lower side of the sliding surface.

13. The evacuation assembly of claim 12, wherein the longitudinally extending support tube has a larger cross-sectional dimension than the two longitudinally extending border support tubes.

14. The evacuation assembly of claim 12, wherein the evacuation assembly further comprises a sheet coupled to and extending between lower portions of the longitudinally extending support tube and the two longitudinally extending border support tubes, wherein the sheet forms at least a portion of the bottom surface of the evacuation slide.

15. The evacuation assembly of claim 11, wherein the longitudinally extending support tube forms a middle divider between the two longitudinally extending border support tubes and divides the sliding surface into two lanes.

16. The evacuation assembly of claim 15, wherein the evacuation assembly further comprises a sheet coupled to and extending between lower portions of the longitudinally extending support tube and the two longitudinally extending border support tubes, wherein the sheet forms at least a portion of the bottom surface of the evacuation slide.

17. The evacuation assembly of claim 11, wherein the evacuation slide further comprises a transverse support tube that extends in the width direction and that forms at least a portion of the bottom surface of the evacuation slide.

18. An evacuation assembly of an aircraft, the evacuation assembly comprising:
   an inflatable evacuation slide comprising a longitudinally extending support tube having an airfoil cross-sectional shape, two longitudinally extending border support tubes, a head portion, a toe portion, a longitudinal axis, a top surface, and a bottom surface, wherein the longitudinal axis extends centrally along a length of the evacuation slide from the head portion to the toe portion, wherein a top perimetrical length of the top surface of the toe portion of the inflatable evacuation slide in a width direction that is perpendicular to the longitudinal axis is less than a bottom perimetrical length of the bottom surface of the toe portion of the inflatable evacuation slide in the width direction;
   a sliding surface coupled to the longitudinally extending support tube and the two longitudinally extending border support tubes, wherein the two longitudinally extending border support tubes extend parallel to the longitudinal axis and wherein the sliding surface forms at least a portion of the top surface of at least the toe portion of the inflatable evacuation slide; and
   a sheet coupled to the longitudinally extending support tube and the two longitudinally extending border support tubes, wherein the sheet forms at least a portion of the bottom surface of at least the toe portion of the inflatable evacuation slide.

* * * * *

UNITED STATES PATENT AND TRADEMARK OFFICE
CERTIFICATE OF CORRECTION

PATENT NO. : 10,464,682 B2  
APPLICATION NO. : 15/400757  
DATED : November 5, 2019  
INVENTOR(S) : Jaro S. Volny et al.

Page 1 of 1

It is certified that error appears in the above-identified patent and that said Letters Patent is hereby corrected as shown below:

In the Claims

Column 8, Line 42 Claim 1:
Delete "s" and insert --d-- at the end of the word defines Column 9, Line 20 Claim 10:
Delete "inflatable"

Column 9, Line 24 Claim 11:
Delete "inflatable"

Signed and Sealed this  
Twenty-fourth Day of March, 2020

Andrei Iancu  
*Director of the United States Patent and Trademark Office*